United States Patent [19]
Raymond, Jr. et al.

[11] Patent Number: 5,178,187
[45] Date of Patent: Jan. 12, 1993

[54] VALVE POSITION INDICATING APPARATUS

[75] Inventors: Frank J. Raymond, Jr., Houston, Tex.; Frank W. Johnston, Clydebank, Scotland

[73] Assignee: Bray International, Inc., Houston, Tex.

[21] Appl. No.: 853,986

[22] Filed: Mar. 20, 1992

[51] Int. Cl.⁵ .............................................. F16K 37/00
[52] U.S. Cl. .................................... 137/556; 116/277
[58] Field of Search ............. 137/553, 556, 556.3, 137/556.6; 116/277

[56] References Cited

U.S. PATENT DOCUMENTS

| | | | |
|---|---|---|---|
| 308,975 | 12/1884 | Mixer | 137/556 |
| 3,452,766 | 7/1969 | Fenster | 137/556 |
| 4,494,565 | 1/1985 | Sinclair et al. | 137/556 |
| 4,494,566 | 1/1985 | Sinclair et al. | 137/556 |
| 4,497,340 | 2/1985 | Gain, Jr. | 137/556 |

*Primary Examiner*—A. Michael Chambers
*Attorney, Agent, or Firm*—Vaden, Eickenroht, Thompson, Boulware & Feather

[57] ABSTRACT

There is disclosed apparatus for indicating the opened and closed positions of a rotary closure member of a rotary valve in which a drum rotatable within a housing to be mounted on the valve has "open" and "closed" indicia thereon movable into positions opposite windows in the wall of the housing in response to rotation of the drum in response to rotation of the closure member.

5 Claims, 2 Drawing Sheets

VALVE POSITION INDICATING APPARATUS

This invention relates generally to apparatus for indicating the opened and closed positions of a rotary closure member of a valve. More particularly, it relates to improvements in apparatus of this type in which a drum having "open" and "closed" indicia therein is connected to a part which is rotatable, in response to rotation of the closures member, within a housing typically installed on the actuator of the valve or apparatus installed on the valve to monitor its position and having windows through which the indicia on the drum may be seen from locations remote from the valve.

As shown and described in U.S. Pat. No. 4,494,566, the housing of indicating apparatus of this type is of cylindrical shape which is so installed as to permit a similarly shaped drum to rotate about the vertical axis of a shaft connected in end to end relation with a part of the actuator or monitor which rotates in response to rotation of the closures member. Since the actuator is often of the type whose operator reciprocates horizontally, and thus of generally elongate configuration, the overall installation lacks symmetry and is thus not aesthetically appealing. Also, if space was a problem, the indicating apparatus might have to be down-sized to the lateral dimension or width of the actuator, thus making its indicia difficult to see from substantial distances.

It is therefore the primary object of this invention to provide apparatus of this type whose shape conforms generally to and is within the lateral confines of a typically elongate actuator and which, at the same time, has indicia which may be easily seen from greater distances.

A more particular object is to provide such apparatus which is of simple and inexpensive construction, and which is easily and quickly assembled.

These and other objects are accomplished, in accordance with the preferred and illustrated embodiment of this invention, by apparatus of the type described which comprises a housing having top, side and end walls with windows therein and a bottom wall with an opening therethrough, and a first bevel gear mounted on the bottom wall for rotation about a vertical axis and having means thereon opposite the opening through the bottom wall to permit it to be rotatably connected to a part exterior of the housing and rotatable in response to rotation of the closure member between its opened and closed positions. More particularly, a drum is supported by the housing for rotation therein about a horizontal axis perpendicular to the vertical axis of rotation of the first bevel gear and with its walls relatively close to the corresponding walls of the housing, and a second bevel gear is supported by the drum for rotation therewith about said horizontal axis and engages the first bevel gear in order to rotate the drum in response to rotation of said part, and thus permit indicia about the drum to be seen through the windows of the housing for indicating the opened and closed positions of the closure member.

As illustrated, the first and second bevel gears have a one to one ratio, and the means for indicating the opened and closed positions are spaced apart at ninety degrees about the horizontal axis of the drum. Also, the drum preferably includes a shaft having its ends supported by the ends of the housing for rotation about said horizontal axis and its mid portion rotatably supported by a bearing mounted in the housing intermediate its ends. More particularly, the bearing includes a sleeve surrounding the shaft and radial arms on the sleeve mounted within the housing above and on opposite sides of the shaft, and the housing, drum and shaft are split along their lengths to permit their assembly in end to end relation.

In the drawings, wherein like reference characters are used throughout to indicate like parts:

Figure 1:
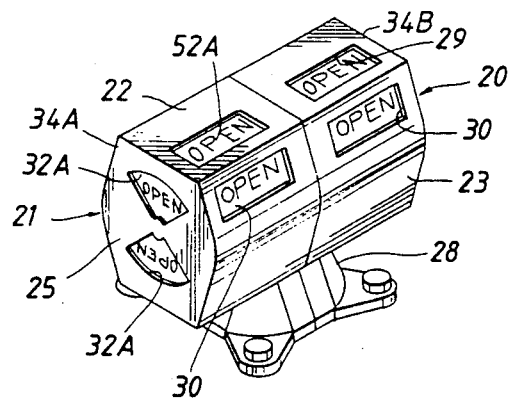
FIG. 1 is a perspective view of an illustrative embodiment of the indicating apparatus adapted to be installed above a valve actuator or position monitor, for connection to a part rotatable with the closure member of the valve, as shown in broken lines, and with the drum thereof moved to a position to indicate the valve closure member to be in its "open" position.

With reference now to the details of the above described drawings, the overall apparatus, which is indicated in its entirety by reference character 20 in FIG. 1, comprises an elongate housing 21 having a top wall 22, front and rear side walls 23 and 24, respectively, end walls 25 and 26, and a bottom wall 27 mounted on a pedestal 28 adapted to be bolted or otherwise secured to the top side of the valve actuator or monitor. As shown, the housing is of generally octagonal shape in cross section, although it may, if desired, be of generally cylindrical shape, depending on the shape of the actuator.

Figure 2:
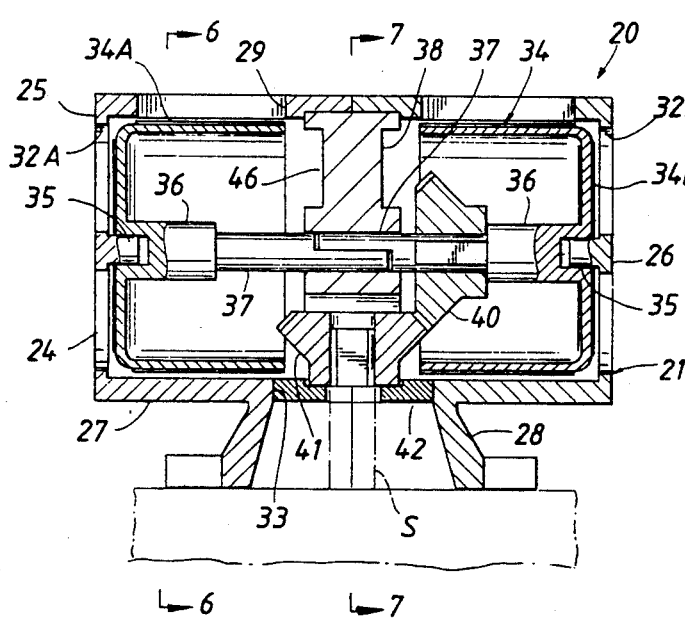
FIG. 2 is a vertical, longitudinal section of the apparatus, on an enlarged scale, and as seen along broken lines FIG. 2—2 of FIG. 3.

The top wall 22 has a pair of side-by-side windows 29 formed therein, each of the front and rear side walls 23 and 24 has a pair of side by side windows 30 and 31, respectively, formed therein, and the end walls 25 and 26 have pairs of vertically spaced windows 32A and 32B formed therein. The bottom wall, on the other hand, has an opening 33 formed therethrough, which, when the apparatus is installed as shown in FIG. 2, is aligned with shaft S which is rotatable with the closure member and which extends through the opening 33, as shown in FIG. 2.

Figure 6:
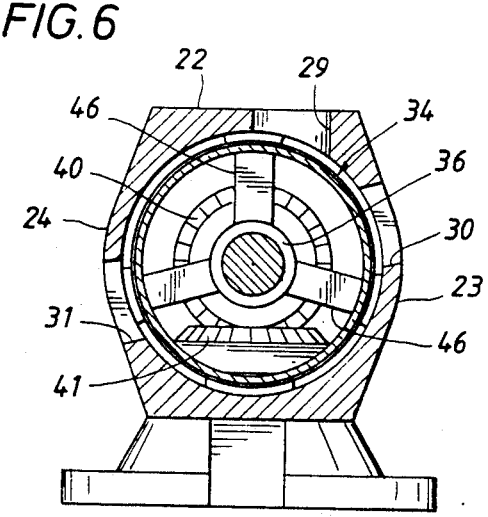
FIG. 6 is a cross-sectional view of the apparatus, as seen along broken lines 6—6 of FIG. 2.
Figure 7:
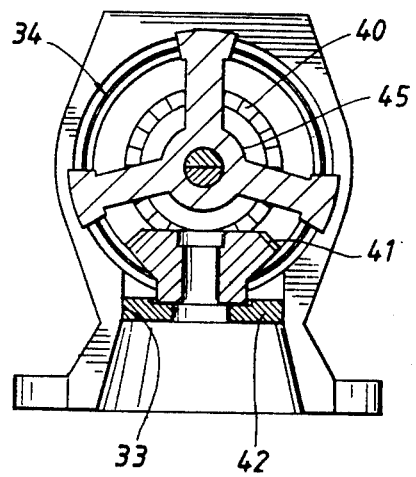
FIG. 7 is another cross-sectional view of the apparatus, as seen along broken lines 7—7 of FIG. 2.

As previously described, the overall apparatus also includes a drum 34 which, as best shown in FIGS. 6 and 7, is of generally cylindrical shape conforming to the inner cylindrical surfaces of the housing walls. The drum has axially spaced apart hollow sections 34A, each of which has a recess in its outer end fitting closely over a pin 35 extending inwardly from the opposite end walls 25 and 26 of the housing so as to support the drum sections for rotation about a horizontal axis concentric to the housing. More particularly, the recesses are formed in stubs or bosses 36 extending inwardly from the end walls of the drum and connected to and having shafts 37 extending from their inner ends for driving connection with one another within a bearing 38 mounting within the housing 21 intermediate its ends.

The housing is made up of longitudinally split sections which fit closely about the drum sections, and a first bevel gear 41 is mounted by a washer 42 on the lower wall of the housing opposite opening 33 and in position to engage the rotatable shaft S extending upwardly from the actuator or monitor and for rotation about its vertical axis perpendicular to the horizontal axis of rotation of the drum. Thus, as best shown in FIG. 2, the washer 41 has a central opening therethrough aligned with an opening in the gear 41 to receive the upper end of the shaft therethrough for connection to the gear, and a second bevel gear 40 is carried about and rotatable with the shaft 37 on the right hand section 34A of the drum in order to rotate the shaft about the axis of rotation of the drum.

As shown, the bevel gears 40 and 41 have the same tooth diameter, and thus have a one to one relation so as to rotate the housing one rotation for each rotation of the shaft S. Putting it another way, the drum is rotated 90° in response to a 90° rotation of the closure member between its opened and closed positions.

As also shown, the bearing 38 has a central sleeve 45 which closely surrounds and thus supports the shaft 37 for rotation about its horizontal axis. The bearing also has arms 46 which extend radially from the top and sides of the sleeve 45 for fitting at their outer ends within slots in the inner wall of the housing to hold the bearing against rotation with respect to the housing. As shown in FIGS. 2 and 7, the lower arms 46 and sleeve 45 of the bearing are placed above the bevel gear 41 as to not interfere therewith.

Figure 8:
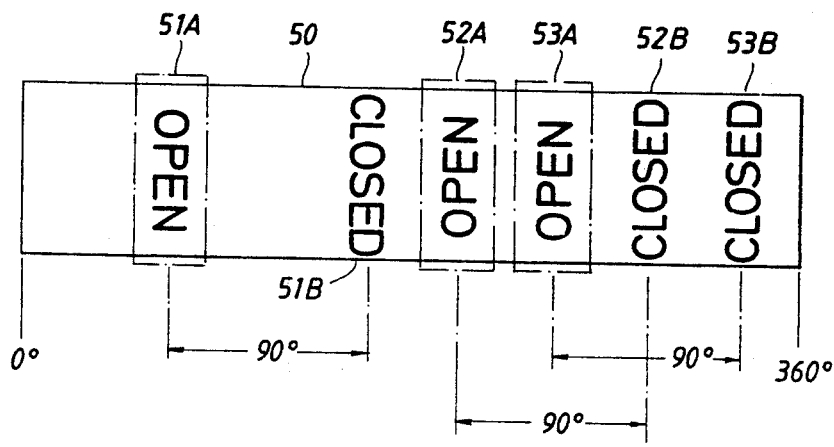
FIG. 8 is a view of a label or a strip bearing indicia and adapted to be wrapped around each end of the drum of the apparatus in position to be seen through the windows.
Figure 1:
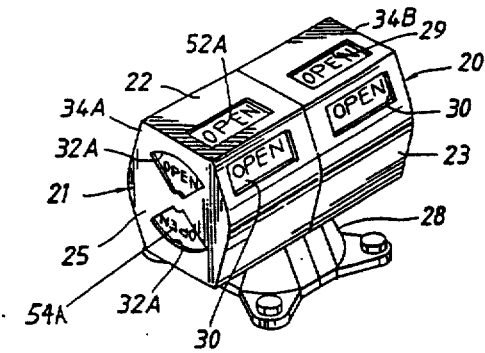
Figure 2:
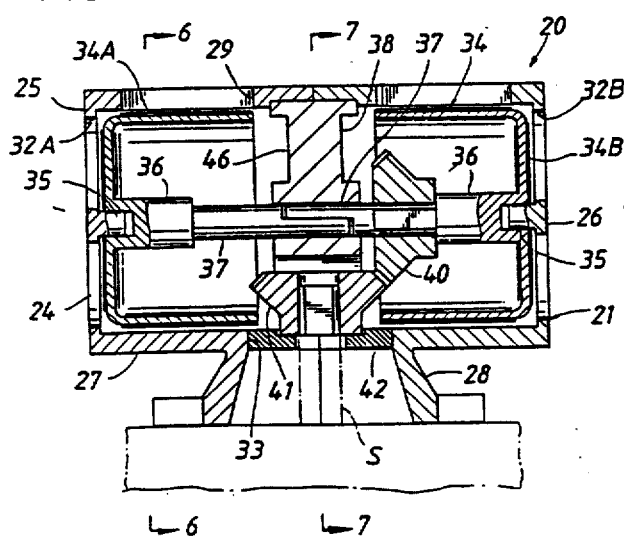
Figure 3:
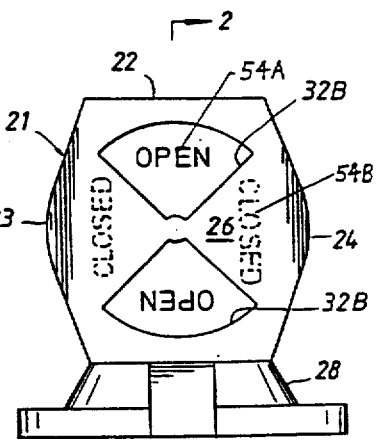
Figure 4:
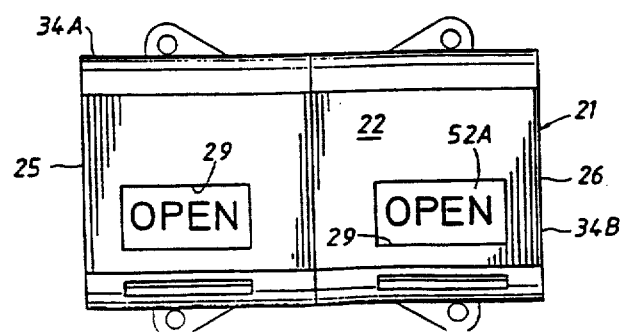

As shown in FIG. 8, the label 50 Which is adapted to be disposed about each end of the drum section has three pairs of "open" and "closed" indicia thereon spaced 90° from one another, such that the indicia will appear in the respective windows in the top and sides of the housing in the opened or closed position of the closure member. Thus, the indicia 51A and 51B are adapted to be alternately moved into positions opposite the windows 31 in the rear side wall 24 of the housing, depending, of course, upon the position of the closure member. For example, with the closure member in its open position, the "open" indicia 51A appear opposite the windows 31 while the "closed" indicia 51B arranged at 90° from indicia 51A are opposite a solid portion of the housing intermediate the windows 29 and 31.

The indicia 52A and 52B, on the other hand, which are also arranged at 90° from one another, are, in the open position to the closure member, disposed with the "open" indicia 52A opposite the windows 29 in the top wall and the "closed" indicia 52B opposite a solid portion of the front side of the housing beneath the windows 30. The indicia 53A and 53B, which are also spaced apart 90° are adapted to alternately appear within the windows 30 on the front side 23 of the housing depending on the position of the closure member. Thus, with the closure member opened, "open" indicia 53A is opposite the windows 30, while the "closed" indicia 53B is opposite a solid portion of the front side wall of the housing near its lower side.

As the drum rotates 90° in a counterclockwise direction (FIG. 6), in response to closing of the valve, "closed" indicia 52B moves 90° to a position opposite the window 29, while the "open" indicia 52A moves into a position opposite a solid portion of the housing just above the window 31. At the same time, the "closed" indicia 51B moves into positions opposite windows 31, while the "open" indicia 51B moves opposite a solid portion of the bottom wall of the housing intermediate windows 30 and 31. Still further, "closed" indicia 53B moves into positions opposite windows 30, while the "open" indicia 53A moves opposite a solid portion of the top wall of the housing intermediate windows 29 and 30.

Figure 3:
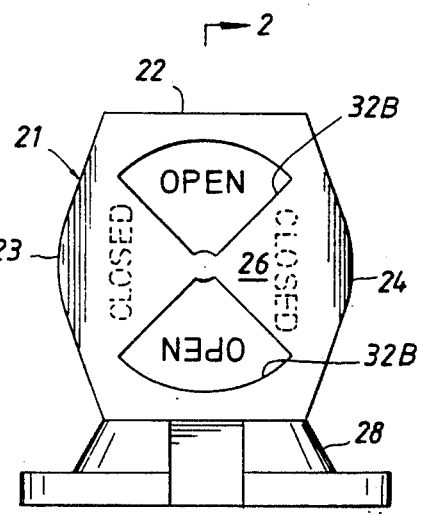
FIG. 3 is a view of the apparatus as seen from the right hand end thereof.
Figure 4:
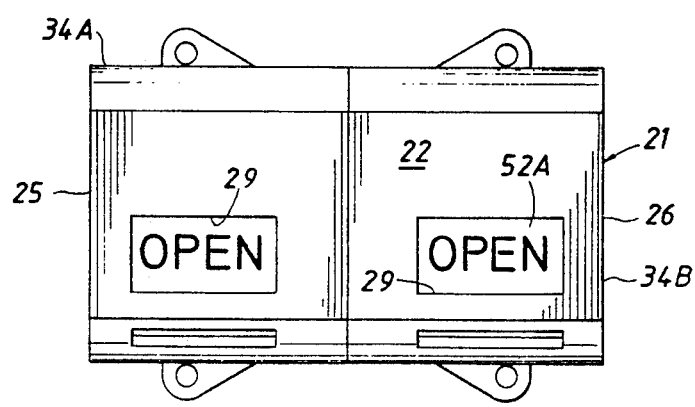
FIG. 4 is a view of the top of the apparatus.
Figure 5:
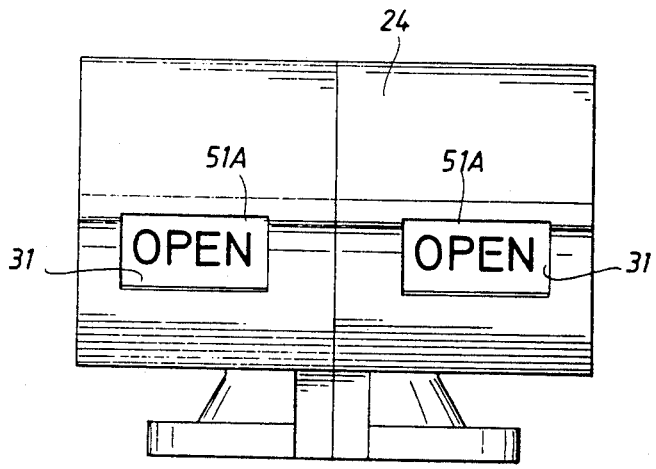
FIG. 5 is a view of the side of the apparatus opposite that shown in FIG. 1.

As shown in FIGS. 1 and 3, indicia 54A and 54B are placed on the ends of the drum sections for alternate disposal opposite the windows 32A and 32B in the end walls of the housing. Thus, as shown, "open" indicia 54A is opposite the windows 32A in the open position of the valve, while "closed" indicia 54B is opposite the intervening solid portions of the side walls. These are of course reverse as the drum rotates 90° in response to movement of the valve to its open position.

In order to assemble the apparatus, the right-hand housing section 30 may be moved over drum section 34B, and gear 40 assembled over the end of shaft 37 of drum section 34B. Bearing 38 may then be assembled over the right-hand shaft section, and the left-hand housing section assembled over drum section 34A. Prior to movement of housing and drum sections including their shaft sections 37 into end-to-end relation, and following rotational adjustment of the right-hand drum to coordinate its indicia, with the housing windows, gear 41 is moved into place and held therein by washer 42. Upon assembly of the housing and drum sections, the washer is secured by welding or otherwise within hole 33 formed by the housing sections. For complete assembly, the housing sections are secured to one another, end to end.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

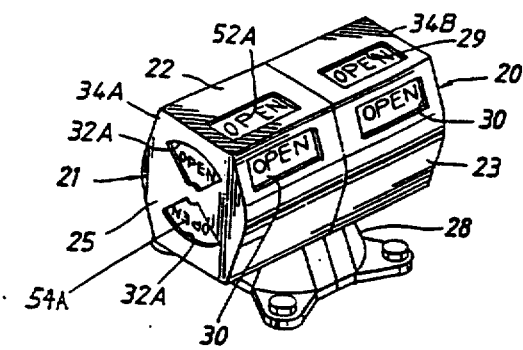

What is claimed is:

1. Apparatus for indicating the opened and closed positions of a rotary closure member of a valve, comprising a housing having top, side and end walls with windows therein and a bottom wall with an opening therethrough, a first bevel gear mounted on the bottom wall for rotation about a vertical axis and having means thereon opposite the opening through the bottom wall to permit it to be rotatably connected to a part exterior of the housing and rotatable in response to rotation of the closure member between its opened and closed positions.

a drum supported by the housing for rotation therein about a horizontal axis perpendicular to the vertical axis of rotation of the first bevel gear and with its top, side and end walls relatively close to the top, side and end walls of the housing, a second bevel gear supported by the drum for rotation therewith about said horizontal axis and engaging the first bevel gear in order to rotate the drum in response to rotation of said part, and means about the drum which is visible through the windows of the housing for indicating the opened and closed positions of the closure member.

2. Apparatus of the character defined in claim 1, wherein the first and second bevel gears have a one to one rotation, and the means for indicating the opened and closed positions are spaced apart at ninety degrees about the horizontal axis of the drum.

3. Apparatus of the character defined in claim 1, wherein the drum includes a shaft having its ends supported by the ends of the housing for rotation about said horizontal axis, and its mid portion rotatably supported by a bearing mounted in the housing intermediate its ends.

4. Apparatus of the character defined in claim 3, wherein the bearing includes a sleeve surrounding the shaft and radial arms on the sleeve mounted within the housing above and on opposite sides of the shaft.

5. Apparatus of the character defined in claim 4, wherein each of the housing, drum and shaft are split along their lengths to permit their assembly in end to end relation.

* * * * *

UNITED STATES PATENT AND TRADEMARK OFFICE
CERTIFICATE OF CORRECTION

PATENT NO. : 5,178,187
DATED : January 12, 1993
INVENTOR(S) : Frank J. Raymond, Jr., et al.

It is certified that error appears in the above-indentified patent and that said Letters Patent is hereby corrected as shown below:

The title page, should be deleted to appear as per attached title page.

IN THE DRAWINGS:

Sheet 1, FIG. 1, the reference numeral 54A should be applied to the "OPEN" indicia opposite window 32A on the end of the drum section displayed;

Sheet 1, FIG. 3, the reference numeral 54A should be applied to the "OPEN" indicia opposite window 32B on the end of the drum section displayed, and reference numeral 54B should be applied to the "CLOSED" indicia indicated as hidden on the end of the drum section as displayed.

Column 3, line 9, replace reference numeral "41" with -- 42 --;
Column 3, line 18, replace "housing" with -- drum --;
Column 4, line 16, replace "open" with -- closed --;
Column 4, line 18, delete reference numeral "30."

Signed and Sealed this

Thirtieth Day of November, 1993

Attest:

BRUCE LEHMAN

Attesting Officer

Commissioner of Patents and Trademarks

United States Patent [19]

Raymond, Jr. et al.

[11] Patent Number: 5,178,187
[45] Date of Patent: Jan. 12, 1993

[54] VALVE POSITION INDICATING APPARATUS

[75] Inventors: Frank J. Raymond, Jr., Houston, Tex.; Frank W. Johnston, Clydebank, Scotland

[73] Assignee: Bray International, Inc., Houston, Tex.

[21] Appl. No.: 853,986

[22] Filed: Mar. 20, 1992

[51] Int. Cl.⁵ .................................................. F16K 37/00
[52] U.S. Cl. ........................................ 137/556; 116/277
[58] Field of Search ............... 137/553, 556, 556.3, 137/556.6; 116/277

[56] References Cited

U.S. PATENT DOCUMENTS 308,975  12/1884  Mixer ................................. 137/556
3,452,766  7/1969  Fenster ............................. 137/556
4,494,565  1/1985  Sinclair et al. .................. 137/556
4,494,566  1/1985  Sinclair et al. .................. 137/556
4,497,340  2/1985  Gain, Jr. .......................... 137/556

Primary Examiner—A. Michael Chambers
Attorney, Agent, or Firm—Vaden, Eickenroht, Thompson, Boulware & Feather

[57] ABSTRACT

There is disclosed apparatus for indicating the opened and closed positions of a rotary closure member of a rotary valve in which a drum rotatable within a housing to be mounted on the valve has "open" and "closed" indicia thereon movable into positions opposite windows in the wall of the housing in response to rotation of the drum in response to rotation of the closure member.

5 Claims, 2 Drawing Sheets